(No Model.) 3 Sheets—Sheet 2.
E. G. LATTA.
VELOCIPEDE.
No. 324,568. Patented Aug. 18, 1885.
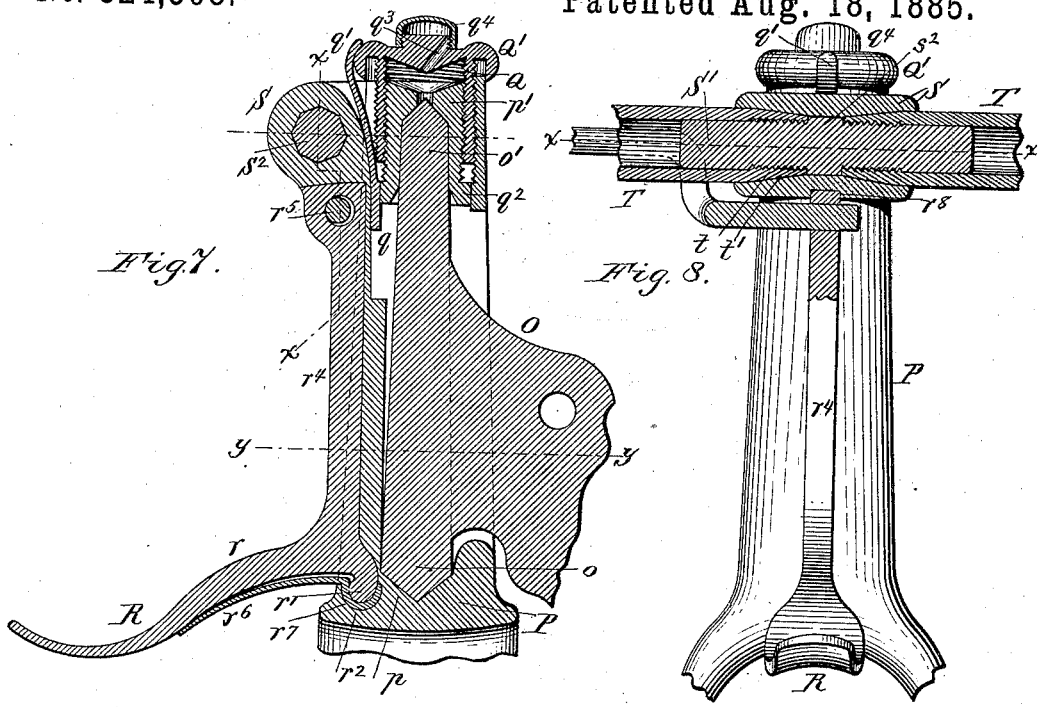
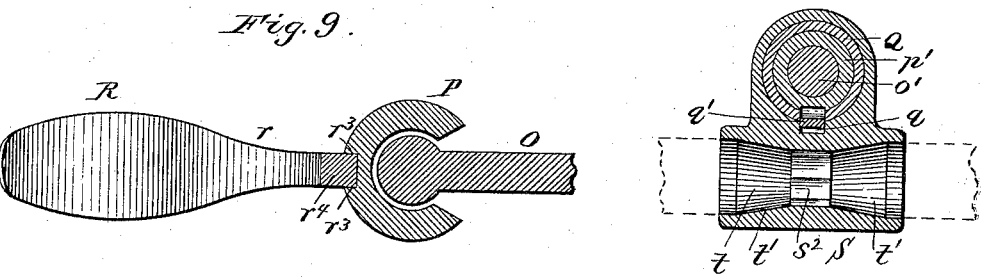
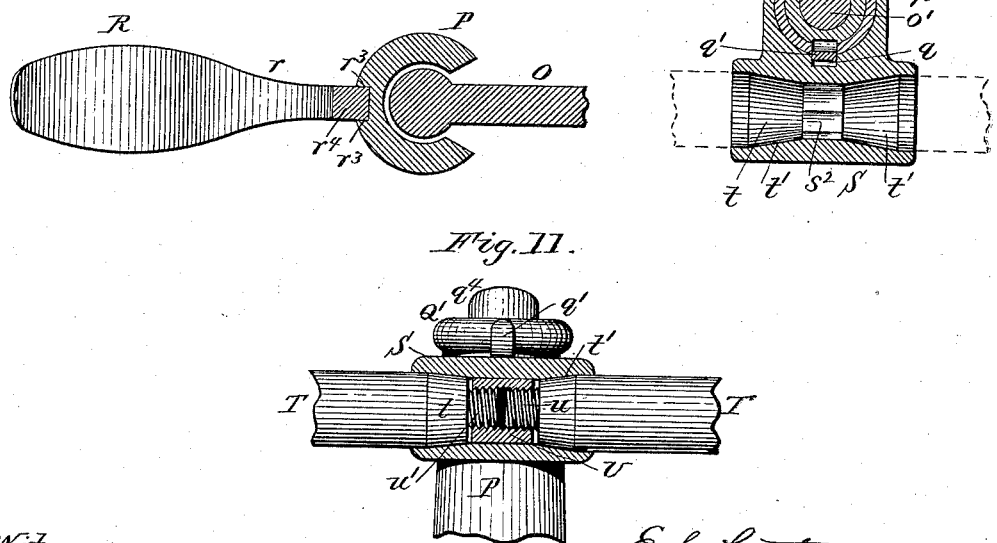
Witnesses:
Theo. L. Popp
Chas. J. Buchheit
E. G. Latta, Inventor.
By Wilhelm & Bonner
Attorneys.

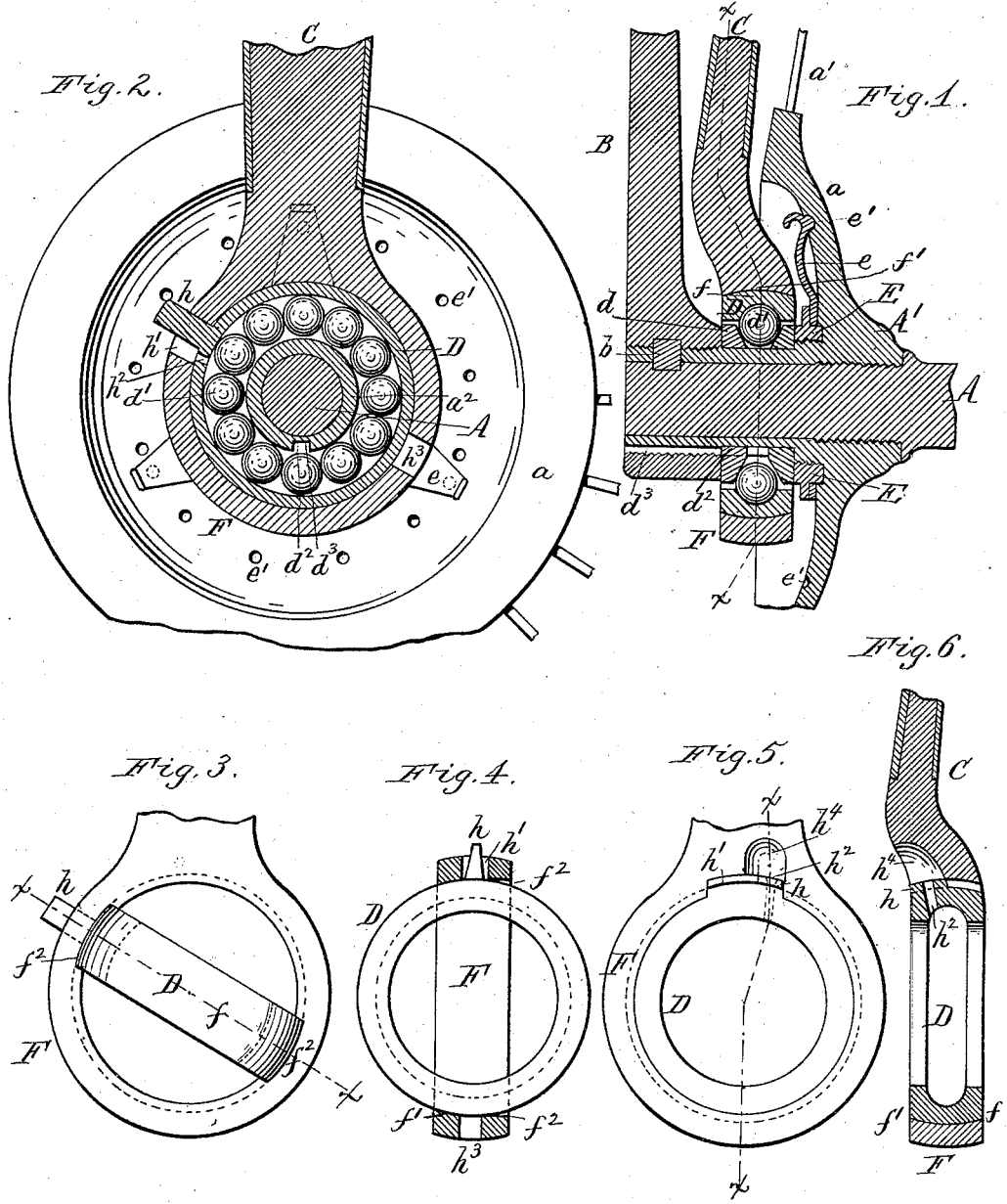

(No Model.)
E. G. LATTA.
VELOCIPEDE.
No. 324,568.  3 Sheets—Sheet 3.
Patented Aug. 18, 1885.
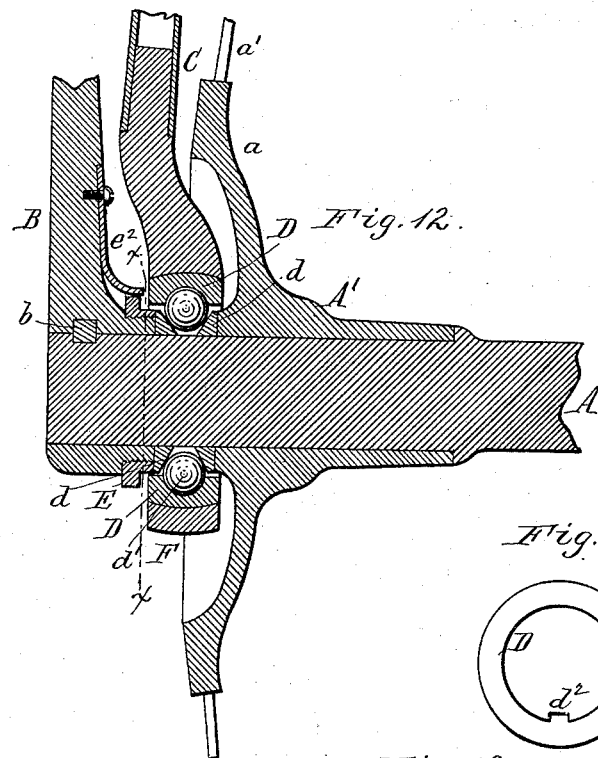
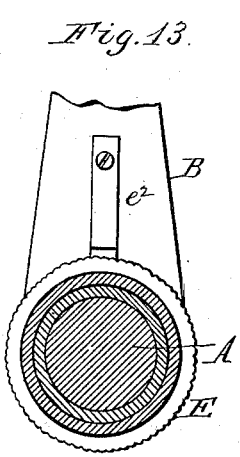
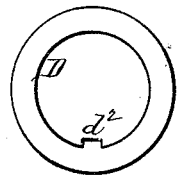
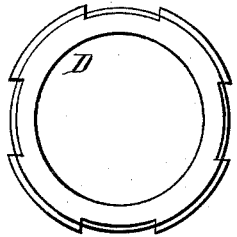
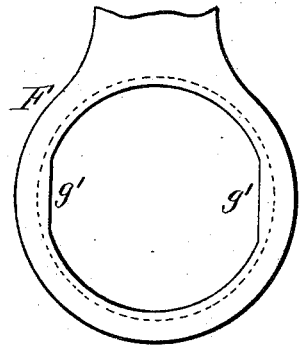
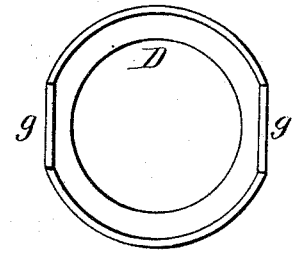
Witnesses.
O. H. Krotz
Theo. L. Popp
E. G. Latta Inventor.
By Wilhelm Bonner
Attorneys.

UNITED STATES PATENT OFFICE.

EMMIT G. LATTA, OF FRIENDSHIP, NEW YORK, ASSIGNOR TO THE POPE MANUFACTURING COMPANY, OF HARTFORD, CONNECTICUT.

VELOCIPEDE.

SPECIFICATION forming part of Letters Patent No. 324,568, dated August 18, 1885.

Application filed April 29, 1884. (No model.)

*To all whom it may concern:*

Be it known that I, EMMIT G. LATTA, of Friendship, in the county of Allegany and State of New York, have invented new and useful Improvements in Bicycles, of which the following is a specification.

The object of this invention is to render the principal working parts of the machine quickly and easily adjustable, and to improve the machine in various other respects.

Heretofore the adjustable parts of bicycles and tricycles—such, for instance, as the cones of the bearings—have been adjusted by screw-threads in various ways, and have been secured, after having been adjusted, by a check-nut, set-screw, or similar device. A check-nut is objectionable, because in tightening the nut the adjustable part is liable to be further tightened, and this has to be allowed for and is uncertain. The friction of the adjustable part directly against the check-nut tends to loosen it and causes inconvenience. A set-screw is still less reliable, and both the check-nut and set-screw require the use of tools when it is necessary to adjust the parts for wear.

One of the principal objects of my invention is to overcome this difficulty and provide a more satisfactory device for adjusting and securing the adjustable part; and my invention consists, to these ends, of the improvements which will be hereinafter fully set forth, and pointed out in the claims.

In the accompanying drawings, consisting of three sheets, Figure 1 represents a sectional elevation of one end of the axle and connecting parts. Fig. 2 is a sectional elevation in line $x\,x$, Fig. 1. Fig. 3 is a side elevation of the lower end of the fork, with the bearing-box in position to be inserted in the same. Fig. 4 is a cross-section in line $x\,x$, Fig. 3. Fig. 5 is a side elevation of the fork with the bearing inserted, the fork and bearing being slightly modified in construction. Fig. 6 is a vertical section in line $x\,x$, Fig. 5. Fig. 7 is a longitudinal vertical section of the steering-head. Fig. 8 is a partly sectional front elevation thereof, the section being taken in line $x\,x$, Fig. 7. Fig. 9 is a horizontal section in line $y\,y$, Fig. 7. Fig. 10 is a horizontal section in line $x\,x$, Fig. 8. Fig. 11 is a sectional elevation showing a modified construction of the means for securing the handle-bars in the lug of the steering-head. Fig. 12 is a sectional elevation of one end of the axle, showing a modified construction of the device whereby the cone-bearings are adjusted. Fig. 13 is a sectional elevation in line $x\,x$, Fig. 12. Fig. 14 is an elevation of one of the cones. Fig. 15 is an elevation of a modified construction of the bearing-box. Fig. 16 is a side elevation of a frame, and Fig. 17 a side elevation of a bearing box, showing a modified construction of these parts.

Like letters of reference refer to like parts in the several figures.

A represents the axle; A', the hub provided with the usual disk, $a$, to which the spokes $a'$ are attached, and with a tubular extension, $a^2$, which incloses the outer portion of the axle, and which extends to the outer end thereof, or as near to the end as may be desired.

B represents the crank secured by a cross-key, $b$, or other suitable means to the tubular extension $a^2$ of the hub.

C represents the lower end of the fork or frame. D represents the bearing-box seated therein, and $d\,d$ represent the cone-bearings arranged in the box D.

$d'$ represents the balls interposed between the cone-bearings $d\,d$ and the box D. The cone-bearings $d\,d$ are fitted upon the tubular portion $a^2$ of the hub, and are prevented from turning thereon by projections $d^2$, formed on their inner sides, and entering a longitudinal groove, $d'$, formed in the surface of the tubular extension $a^2$.

E represents an adjusting ring or nut arranged on the inner side of the inner cone-bearing $d$, as represented in Fig. 1, and provided with an internal screw-thread engaging with an external thread formed on the central portion of the hub. The ring E bears against the inner side of the rear cone-bearing $d$, and holds the same in proper adjustment with reference to the outer cone-bearing $d$ and balls $d'$. By turning the ring E the bearing-surfaces are adjusted as may be required, the cone-bearings being capable of an axial movement toward and from each other, while they are prevented from turning on the extension $a^2$. This prevents the cone-bearings from tending to turn the adjusting-ring E. The latter is secured in position by one or more spring-arms, $e$, secured with their inner ends to the ring E, and adapted to engage with their ends in one of an annular series of depressions, $e'$, formed in the outer side of the hub-disk $a$, concentric with the axle A. The spring-arms $e$ are made so long that, by taking hold of them, the adjusting-ring E can be easily turned. When two or more arms $e$ are secured to the ring E, the arms are so arranged with reference to the depressions $e'$ that only one of them engages with one of the depressions at a time, while the remainder of the arms stand at various distances between the depressions. By increasing the number of arms $e$ and arranging them in the manner specified, any desired fineness or nicety of adjustment can be obtained without increasing the number of depressions or placing them too closely together. The arms $e$ will engage in the depressions $e'$ automatically and securely lock the ring E in position after it has been adjusted. The arms $e$ permit the desired adjustment to be effected easily and quickly and without the necessity of employing wrenches or other tools for the purpose. The tubular extension $a^2$ of the hub increases the strength of the outer end of the axle and permits the latter to be made lighter than usual. The key $b$, whereby the crank is secured to the axle, also serves to secure the hub to the axle, as it passes through the tubular part $a^2$. The cones $d\ d$ are interchangeable, and as they are made separate from the adjusting device they require little finishing and can be cheaply replaced when worn. The spring-arms may be made long enough to engage into the spoke-holes on the inner edge of the hub-flange, if desired. The ring E may be arranged on the crank, as represented in Figs. 12 and 13, and be constructed with a milled or notched collar, against which the spring $e^2$ engages, which is attached to the inner side of the crank for locking the ring in position after it has been adjusted.

Instead of attaching the spring-arms to the ring E, they may be attached to the outer side of the hub-flange and engage with the ring E; or, instead of employing a spring for locking the ring E after it has been adjusted, a rigid arm and a set-screw may be employed; but such a construction would not be so desirable, as it is not automatic.

The bearing-box D is constructed with a spherical outer surface, $f$, which is seated in a spherical recess, $f'$, formed in the end of the fork or frame, so that the fork or frame can adjust itself freely on the bearing, whereby all binding of these parts is prevented.

The portion F of the fork which surrounds the bearing D is made in one piece, and the bearing is introduced into the concave recess formed on the inner side of the end of the fork, in such manner that the bearing is held in position without the employment of any fastening devices. As represented in Figs. 1, 2, 3, and 4, this portion of the fork is provided on one side with recesses $f^2$, which permit of the introduction of the bearing-box D into the concave seat of the fork by placing the bearing-box on edge with reference to the round end F of the fork, and introducing it in this position through the recesses $f^2$ into the concave seat, as illustrated in Fig. 3, the recesses being made sufficiently large to permit the bearing-box D to pass through the same in this position. When the bearing-box has been introduced into the end F of the fork, so that the centers of said end and of the bearing-box coincide, as represented in Fig. 4, the bearing-box is given a quarter turn, whereby it seats itself in the concave seat $f'$ of the fork. The bearing being applied to the axle it is secured in position by the axle or spindle, which prevents the bearing from turning back into the position in which it can be removed from the fork, and in this manner the bearing box is firmly held in the fork. The recesses $f^2$ are preferably arranged on the rear side of the fork, so that they are hidden from view.

The spherical outer surface of the bearing-box and its seat in the fork constitute a universal joint, which enables the fork or frame to spring or twist on the box without causing friction and forms a cheap device for attaching the bearing-box to the frame.

In the construction represented in Figs. 5 and 6 a slot is cut in one edge of the frame, and this slot must be cut twice as deep as where two are used.

Fig. 15 illustrates the form of bearing-box which may be inserted into the frame without cutting the latter. The fork may be provided with a simple concave spherical seat to fit the greatest diameter of the box, or it may be provided with a seat having the proper form to fit the box.

Figs. 16 and 17 represent the box and supporting-frame, both of which are cut to admit the box into the seat in the fork and to prevent it from revolving in the seat. In this construction the front and rear sides of the outer surface of the box are made cylindrical in form, as represented at $g$, and the corresponding portions of the frame are made flat, as represented at $g'$. The frame or fork which incloses the bearing D may of course be made bifurcated or open at one side for the insertion of the bearing-box, and provided with a cross-bolt for tightening it, if so desired; but such a construction is more expensive than the construction which I have above described.

$h$, Figs. 2, 3, and 4, represents a small stud or projection formed on or secured to the outer side of the bearing-box D and entering a slot or elongated opening, $h'$, in the frame F.

$h^2$ is the oil-hole formed in the bearing-box on the front side of the stud $h$, so as to be exposed or accessible through the slot $h'$ when the pin $h$ rests against the rear side of said slot, as represented in Fig. 2. The movement of the axle or spindle in the bearing-box tends to hold the box in the position in which the pin $h$ rests against the front end of the slot $h'$, in which position the oil-hole $h^2$ is covered by the frame. When it is necessary to oil the box or bearing, it is moved back by the projection or pin $h$ until the oil-hole is exposed through the slot $h'$. The pin $h$ has sufficient lateral play in the opening $h'$ to permit the pin to enter this opening in an inclined position in inserting the bearing into the fork. The frame F is provided with a similar slot, $h^3$, arranged diametrically opposite the slot $h'$, so that the bearing-box can be reversed when worn.
In the construction represented in Figs. 5 and 6 the oil-duct $h^2$ is formed directly in or through the pin $h$, and the oil is introduced through a depression, $h^4$, in the face of the fork.
O represents the front portion of the backbone or reach, provided with an upper and lower center, $o$ $o'$, in the usual manner.

P represents the steering-head, formed with a lower center bearing, $p$, which receives the lower center, $o$.

$p'$ represents the upper adjustable center bearing resting on the upper center, $o'$, and made vertically adjustable in the upper portion of the steering-head P. The center bearing, $p'$, is provided with an external screw-thread, which engages with an internal thread formed in a tubular adjusting-screw, Q. The latter is provided with an external thread engaging in an internal thread formed in the upper hollow portion of the steering-head P. The latter is provided on its front side with a vertical slot, $q$, to receive the lower end of a spring, $q'$. The upper end of the screw Q is provided with a milled head, Q', which surrounds or overlaps the cylindrical portions of the steering-head P. The inner and outer screw-threads of the adjusting-screw are made of different pitch, whereby a fine adjustment of the center bearing is obtained. The lower enlarged portion of the spring Q engages in a recess in the lower collar, $q^2$, of the center bearing, $p'$, whereby the latter is held against turning, but permitted to move vertically in being adjusted.
To assemble the parts, the center $o'$ is first placed in the steering-head P. The spring $q'$ is then dropped into the slot $q$. The upper bearing, $p'$, is then screwed partly into the screw Q, and the latter is then screwed into the head to about the position represented in Fig. 7. The spring $q'$ is then drawn up until its enlarged end rests in the slotted collar $q^2$ of the bearing to hold the latter from turning, in which position of the spring its upper end hooks over and bears against the milled head of the screw Q. The spring $q'$ locks the adjusting-screw Q in position after it has been adjusted, but permits the screw to be turned by applying the proper force. By turning the screw Q in the proper direction, the bearing $p'$ is forced down on the center $o'$, on which it is held against turning by the spring $q'$ so that the friction cannot unscrew it.

$q^3$ represents the oil-duct formed in the top of the adjusting-screw Q, and covered by a dust-cap, $q^4$.

R represents the brake spoon or plate, and $r$ the arm extending rearwardly from the brake-spoon R to the steering-head P, and provided at its rear end with a knuckle, $r'$, seated in a recess, $r^2$, formed in the front side of the steering-head.

$r^3$ is a vertical recess formed in the front side of the steering-head and extending upwardly from the knuckle-recess $r^2$ to the under side of the handle-lug S.

$r^4$ is the brake-arm extending upwardly from the knuckle $r$ to the brake-bar $r^5$. The upright arm $r^4$ rests with its rear side in the recess $r^3$ of the steering-head.

$r^6$ is a spring extending along the under side of the arm $r$ of the brake, and provided with a hook-shaped or bent rear end, $r^7$, which is seated in the recess $r^2$ and forms a seat for the knuckle $r'$. The front end of the spring bears against the under side of the brake-spoon. The knuckle $r'$ is made hook-shaped, and descends below the front edge of the recess $r^2$, whereby the brake is attached to the steering-head without any other fastening devices.

The brake is attached to the steering-head by first inserting the spring, then pressing the brake spoon into the rubber tire until the hook-shaped knuckle $r'$ enters the seat in the steering-head and the upper end of the arm $r^4$ enters under the handle-bar lug S, which latter is provided on the under side with a groove, $r^8$, into which the upper end of the arm $r^4$ projects and whereby it is held against lateral displacement. The brake-lever $r^5$ is then attached and its sweep is limited, so that it can force the brake downwardly upon the wheel to apply the necessary force, but not far enough to permit the arm $r^4$ to move from under the handle-bar lug.

The brake may be so formed that it can only be inserted when the wheel is out of the forks, in which case the brake-lever need not be limited in its movement. The brake rests closely against the front side of the steering-head, and is partly hidden from view in the groove $r^3$ of the steering-head, whereby the appearance of the steering-head is rendered much lighter and more attractive than heretofore.
T T are the handle-bars, provided with conical inner ends $t$, fitted in conical seats $t'$ in the handle-bar lug S.

S' is a right and left hand screw arranged in the handle-bar lug S, and engaging with the threaded ends of the handle-bars T. The right and left hand screw S' is provided with a flat-sided collar, $s^2$, seated in a correspondingly-shaped recess in the handle-bar lug, whereby the screw is prevented from turning in the handle-bar lug. Any other suitable means for preventing it from turning may be employed, if desired, but the attachment should be such that the screw can be drawn out and turned partly and again inserted, in order to adjust the bars. The latter are screwed onto the screw S' by using the bent portions of the bars as cranks to turn them. When the bars have been tightened, and it is found that the bent ends do not stand at the same angle, one bar can be turned back and the other forward until both bars stand in the same position. One of the bars is then unscrewed, and the other bar, with the screw attached, is drawn out, turned to the desired position, the screw again inserted, and the other bar again secured until the handle-bars stand in the same position when drawn up tightly. In this position of the handle-bars the action of the rider pulling back on the handles tends to secure the bars more firmly in the handle-bar lug. The screw S' extends out beyond the lug S on both sides to stiffen the handle-bars at the point of greatest strain.

Fig. 11 illustrates a modified construction of this fastening. It consists of a right and left hand screw-sleeve, U, seated in the handle-bar lug in the same manner in which the screw S is seated in the same, and engaging with right and left hand screw-threads $u$ $u'$ at the inner ends of the handle-bars.

A screw provided with differential screw-threads may be substituted for the right and left hand screw, if desired.

I am aware that handle-bars have been secured by a nut in the center of the lug, which is cut away to receive the nut and permit it to be turned, but this construction weakens the lug and is unsightly. Handle-bars have also been provided with conical inner ends connected by a simple screw and secured by a screw passing through the side of the lug and each bar, but this arrangement requires very careful fitting to tighten both bars at the same angle, and when loose it is difficult to again tighten them.

I claim as my invention—

1. The combination, with the axle and bearing, of a hub provided on its outer side with a tubular extension inclosing the outer portion of the axle and passing through the bearing, substantially as set forth.

2. The combination, with the axle, of a hub provided on its outer side with a tubular extension inclosing the outer portion of the axle, a crank, and means whereby the crank, tubular extension, and axle are secured together, substantially as set forth.

3. The combination, with the axle or spindle and a surrounding bearing-box, of two similar cones capable only of axial movement on the axle, balls interposed between the cones and the bearing-box, and an adjusting device whereby one of said cones is adjusted, substantially as set forth.

4. The combination, with the axle or spindle having a longitudinal groove, $d^3$, of cones $d$ $d$, provided with projections $d^2$, adjusting-ring E, bearing-box D, and balls $d'$, substantially as set forth.

5. The combination, with the axle or spindle and a surrounding bearing-box, of two similar cones capable only of axial movement on the axle, balls interposed between the cones and the bearing-box, and an annular screw whereby one of the cones can be adjusted, substantially as set forth.

6. The combination, with the axle and the adjustable cones of the bearing, of an annular adjusting-screw made separate from the cones, and a spring-arm attached to said annular screw whereby the latter is locked in position, substantially as set forth.

7. The combination, with the axle, bearing, and annular adjusting-nut provided with a series of locking-arms, of a wheel having an annular series of stops or depressions so arranged with reference to the locking-arms that only one arm will engage with said stops or depressions at a time, substantially as set forth.

8. The combination, with a bearing, of a movable ring provided with a series of catches, and a series of stops so arranged with reference to the catches that only one catch will engage with a stop at a time, substantially as set forth.

9. The combination, with the axle or spindle, cones $d$ $d$, bearing-box D, and balls $d'$, of the adjusting-ring E, provided with a series of spring-catches, $e$, and the hub A', provided with an annular row of stops or depressions, $e'$, substantially as set forth.

10. The combination, with a supporting-frame provided with an annular spherical recess or seat partly cut away, of a bearing-box provided with a convex outer spherical surface, and adapted to be introduced into the recess of the frame through the cut-away portion thereof and to be held in the frame upon being turned into its normal position, substantially as set forth.

11. The combination, with a bearing-box, of a supporting-frame made in one piece, and provided with an annular seat of larger diameter at its middle than at its edges, whereby the bearing-box is held in said seat, substantially as set forth.

12. The combination, with the supporting-frame provided with an annular recess, $f$, having a concave inner face, and an opening, $h'$, of an annular bearing-box, D, having a spherical outer face, and a projection, $h$, entering the opening $h'$, whereby the bearing-box is prevented from revolving with the axle, substantially as set forth.

13. The combination, with the supporting-frame provided with an annular recess, $f$, having a concave inner face, and an opening, $h'$, of an annular bearing-box, D, having a spherical outer face, and a projection, $h$, entering the opening $h'$, whereby the bearing-box is prevented from revolving with the axle, and an auxiliary opening, $h^3$, which permits the bearing-box to be reversed, substantially as set forth.

14. The combination, with a supporting-frame provided with an opening, $h'$, of a bearing-box seated in said frame and capable of being moved therein, and provided with an oil-hole, $h^2$, which can be exposed through the opening $h'$ or be covered up by the inclosing-frame, at desire, substantially as set forth.

15. The combination, with the steering-head, of the upper adjustable center bearing capable of moving vertically in the steering-head, and a differential screw whereby said bearing is adjusted, substantially as set forth.

16. The combination, with the steering-head P, center $o'$, and adjustable center bearing, $p'$, of the differential adjusting-screw Q, provided with a milled head, Q', overlapping the upper end of the steering-head, substantially as set forth.

17. The combination, with the steering-head, center $o'$, and adjustable center bearing, $p'$, of the differential adjusting-screw Q, constructed with a milled head, Q', and a locking-spring, $q'$, attached to the steering-head, substantially as set forth.

18. The combination, with the steering-head provided with a recess and spring, $q'$, seated therein, of the adjustable center bearing, $p'$, provided with a recess for the reception of said spring, and whereby said center bearing is prevented from turning, but permitted to move vertically, substantially as set forth.

19. The combination, with the steering-head provided with a recess in its front side, of a brake arranged in said recess, substantially as set forth.

20. The combination, with the steering-head provided with a recess in its front side, of a spring seated with its rear end in said recess, and a brake seated in said recess on the rear end of said spring, substantially as set forth.

21. The combination, with the steering-head provided on its front side with a recess and on its upper end with a projection, of a brake seated in said recess and guided with its upper end in said projection, substantially as set forth.

22. The combination, with the steering-head P, provided with a recess, $r^2$, and handle bar lug S, having a guide, $r^3$, of the brake R, provided with the knuckle $r$, seated in said recess $r^2$ and having its upper end arranged in the guide $r^3$, substantially as set forth.

23. The combination, with the handle-bar lug, of a right and left hand screw seated in said lug and held therein against turning, and handle-bars one of which is provided with a right and the other with a left screw-thread engaging with said right and left hand screw, substantially as set forth.

24. The combination, with the handle-bar lug S, of the tubular handle-bars T and screw S', extending into the handle-bars beyond the handle-bar lug S, substantially as set forth.

EMMIT G. LATTA.

Witnesses:
S. M. NORTON,
S. G. LATTA.